Figure 4:
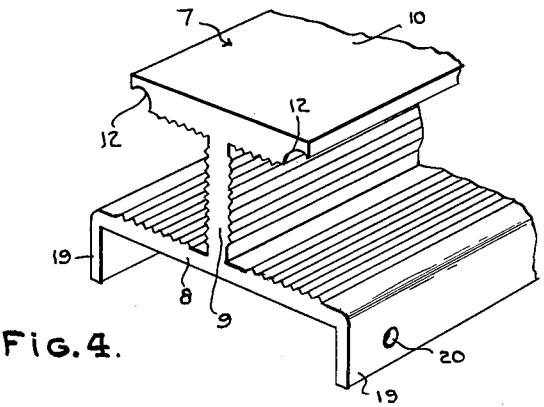

June 19, 1962 H. S. DUNN 3,039,232
CONNECTOR FOR MOUNTING ROOF FORMING PANELS
Filed July 6, 1959 2 Sheets-Sheet 1
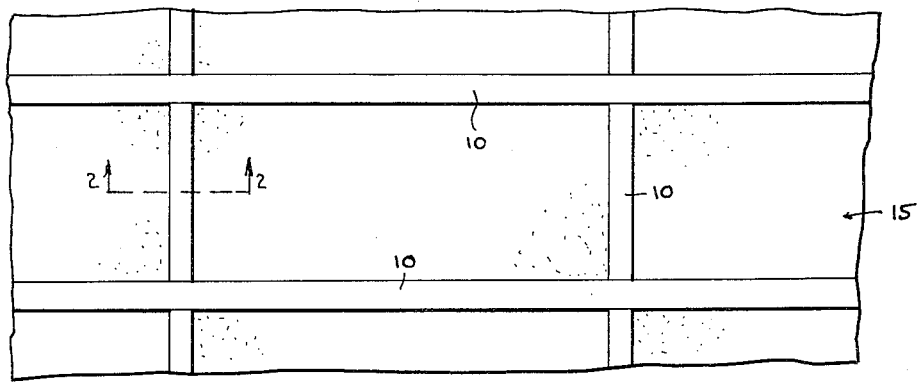
Fig. 1.
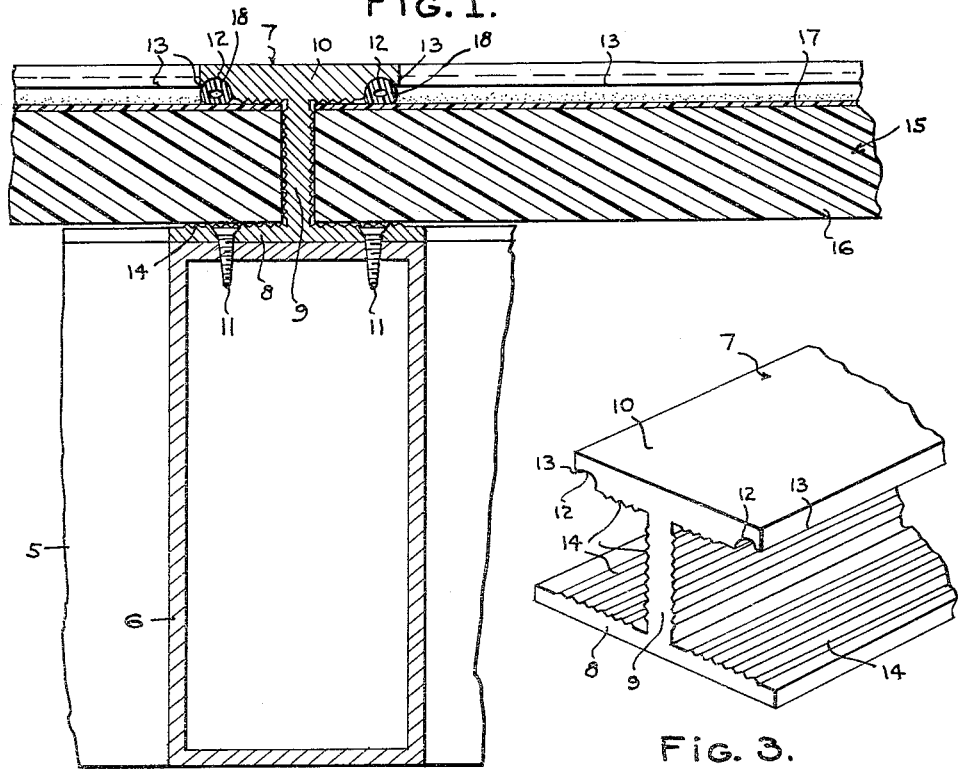
Fig. 2.
Fig. 3.
INVENTOR.
HAROLD S. DUNN,
BY
ATTORNEY

INVENTOR.
HAROLD S. DUNN,
BY
ATTORNEY

United States Patent Office 3,039,232
Patented June 19, 1962

3,039,232
CONNECTOR FOR MOUNTING ROOF
FORMING PANELS
Harold S. Dunn, 163 Fiesta Way, Fort Lauderdale, Fla.
Filed July 6, 1959, Ser. No. 825,045
2 Claims. (Cl. 50—346)

This invention relates to connector devices for the mounting of roof panels in overlying relation to a building structure, such as screened-in patios, swimming pools or the like and to either form a partial roof covering or a complete roof covering over an entire area.

The invention comprises a connector bar of I-beam shape that receives the marginal edges of the roof panel and with the bar including a head portion and a base portion and with the marginal edges of the head portion being provided with underneath locking grooves for the reception of weather stripping and whereby to weather the panels with respect to the bars in a normal manner.

The invention further contemplates a connector bar of I-beam shape having its inner surfaces longitudinally serrated to form frictional gripping engagement with the marginal portions of the roof panel and to also constitute a plurality of barriers against the possible entry of water beyond the weather strips.

The installation and water-proofing of flat roof forming panels has been extremely difficult from the standpoint of preventing the flow of water from the tops of the panels to eventually drip downwardly into the enclosure. Roof panels, such as the roof panel disclosed in my copending application, Serial No. 819,447 filed June 10, 1959 and that comprised a relatively thick polystyrene foam panel and an overlying polyester fiberglass panel that are united together and whereby the united foam panel and the polyester fiberglass provided an insulating and light transmitting unit. It has been found, that to provide a bar similar to that hereinafter described, the panel is engaged along its marginal edges into the oppositely facing channels of the bar and a vinyl weather stripping then forcibly engaged into the grooves of the head of the bar, locking the vinyl strip in compressed relation to the upper surface of the panel, such vinyl strip being extended around each particular opening formed by longitudinal and transverse bars. The compressible vinyl strip is usually tubular and highly successful as a weather stripping and also has been highly successful in various other structural members, such as the conventional screen frames or the like.

Novel features of construction and operation of the device wil be more clearly apparent during the course of the following description, reference being had to the acompanying drawings wherein has been illustrated preferred forms of the device and wherein like characters of reference are employed to denote like parts through the several figures.

Figure 5:
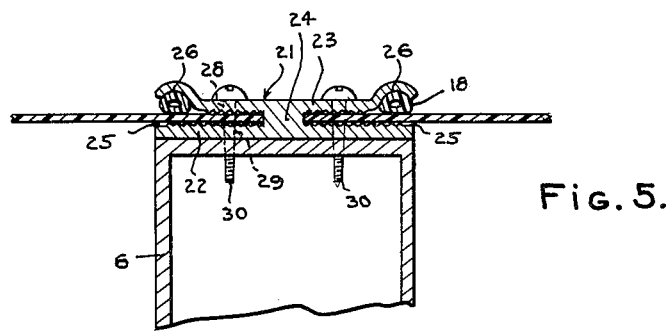
Figure 6:
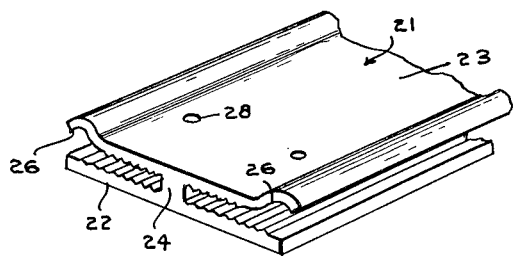

In the drawings:

FIGURE 1 is a fragmentary top plan view of a roof section embodying the invention, FIGURE 2 is an enlarged transverse section taken substantially on line 2—2 of FIGURE 1, FIGURE 3 is a fragmentary perspective view of a connector bar embodying the invention, FIGURE 4 is a fragmentary perspective view of a slightly modified form of the invention, FIGURE 5 is a fragmentary transverse section similar to FIGURE 2, but illustrating a further modified form of the invention, and FIGURE 6 is a fragmentary perspective view of a bar showing the invention illustrated in FIGURE 5.

Referring specifically to the drawings, a superstructure is employed in the form of extruded rafter forming beams 5 and mullion forming beams 6. The beams 5 and 6 are extruded from aluminum and are generally rectangular in cross section.

Fixedly engaged upon the tops of the beams 5 and mullion 6, is a connector bar 7. The bar in transverse section is of I-beam shape, embodying a base 8, a vertical web 9 and a head 10. The base 8 is substantially coextensive in width with the tops of the beams and mullions 5 and 6. The base 8 is fixedly engaged upon the tops of the beams and the mullions, by screws 11. The marginal edges of the head 10 are undercut to form semi-cylindrical spline grooves 12 and with the grooves 12 terminating in outer locking beads 13. The underneath faces of the head 10, the opposite faces of the web 9 and the upper faces of the base 8 are longitudinally serrated as indicated at 14. The bar 7 is preferably extruded from aluminum, having a high degree of resistance to corrosion. The head 10 is relatively thicker than the base 8. The longitudinal and transverse bars 7 are interconnected at their points of meeting to form a substantially close joint. This connection may be made by cutting away the head 10 and the base 8 of the transverse bar 7, leaving a projecting end of the web 9 that will interfit into the channels of the I-beam. Adapted to be engaged within the channels of the bars 7, are roof forming panels, indicated as a whole by the numeral 15. The panels may be of any desirable construction, but for purpose of illustrating one desirable form of panel, there has been indicated a relatively thick polystyrene foam panel 16, having an overlying and connected weathering sheet 17, preferably in the form of polyester resin fiberglass. The sheets 16 and 17 are united permanently together and whereby the panel 16 provides a very definite insulating panel that is semi-translucent to receive light rays that pass through the sheet 17. The panel 15 has been fully disclosed in the copending application above noted.

In the use of this form of the invention, the longitudinal bars 7 are fixed with respect to the rafter forming beams 5, by the screws 11, a marginal edge of a panel 15 is then frictionally engaged into the channel of the bars 7, to engage the serrations 14. The installation of the transverse bars 7 are progressively engaged over the mullion beams 6, in each case being forcibly engaged with the opposite edges of the panel 15 so that the panel has a full seating engagement into the channels. The structure is progressively installed as indicated in FIGURE 1 to form a complete roof enclosure, with the bars 7 overlying the rafters and the mullions. With the roof structure completely installed, the operator then proceeds to force the tubular vinyl weather strip 18 into the grooves 12, in a continuous section around a particular opening. The forcing of the strip 18, causes the strip to be compressed and locked against displacement by the bead 13, forming a definite barrier against the entry of water either above the strip or below the strip, since the strip will simultaneously bind upon the fiberglass sheet 17. Any water that might possibly pass beneath the strip 18, must of necessity follow a tortuous path around the several serrations 14 and, should such condition occur, the degree of water will be greatly retarded in its flow to the interior of the enclosure. The serrations 14 not only form a very definite barrier against a free flow of water, but also frictionally engage the upper and lower sides of the panel.

In FIGURE 4, there has been illustrated a modified form of bar 7, having the base 8, the web 9 and the head 10. This bar is also provided with the spline grooves 12. The base 8 is provided with right angle flanges 19, that are apertured at spaced apart points, as at 20. The flanges 18 with the base 8 form a channel that is adapted to be engaged over the top of the beams 5 and 6 and whereby to facilitate the connection of the bar to the tops of the beams. The engagement of the panel 15 into the channels of the bars 7 may be further water-proof by coating the marginal edges of the panel with a suitable caulking compound.

In FIGURES 5 and 6, there has been illustrated a further modified form of connector bar and relatively thin panels, such as fiberglass plastics, metal or any other desirable roof covering. In this form of the invention, there has been provided a bar, indicated as a whole by the numeral 21 embodying a base 22 and a generally parallel head 23, connected by a relatively thick web 24. The bar 21 effectively forms an I-beam structure having oppositely facing channels 25. The head 23 is relatively flexible with respect to the base 22 and the marginal edges of the head 23 are curved upwardly and downwardly to form spline grooves 26. The inner faces of the base 22 and the head 23 may be serrated longitudinally similar to the first form of the invention and whereby to form frictional gripping means with respect to the marginal edges of panel members 27. The head 23 adjacent its opposite marginal edges are apertured at 28 and the base 22 is also apertured at 29 and with the apertures being in axial alignment and whereby to receive fastening screws 30.

In the use of this form of the invention, the marginal edges of the panel 27 are forcibly engaged into the channels 25 of the bars 21 both longitudinally and transversely of the supporting beams 5 and 6. It is preferable, that a suitable caulking compound be engaged with the marginal portions of the panels 27 to flow into the serrations and to form a definite water barrier. With the panels 27 fully fitted into the channels 25, a suitable drill is passed through the apertures 28 and 29 and whereby to drill openings through the head portion of the beams 5 and 6. The screws 30, being preferably self-threading screws are then partially engaged into the openings after which, the operator forces the tubular vinyl strip 18 into the grooves 26, distorting the strips to forcibly bind against the upper surface of the panel throughout the marginal area of a particular opening. After the strips 18 have been inserted into the grooves 26, the screws 30 are then fully tightened, causing the head 23 to flex downwardly, further compressing the vinyl strip 18 and also further forcing the serrations and the caulking compound into binding engagement with the panel. The forming of the grooves 26, leaves the marginal edges extending slightly below the strips 18, to lock the strips within the grooves 26 against displacement. This form of the invention provides a connector for relatively thin sheets of material, such as the fiberglass previously noted. This form of the invention also provides a very definite seal against the flow of water past the marginal edges of the panels 27 and, as in the first form of the invention, any water that might enter between the panel 27 and the strip 18 will be compelled to follow a tortuous path in order to enter the enclosure beneath the panels 27.

It will be apparent from the foregoing that very novel forms of connector bars have been provided. The bars are quickly and easily installed for receiving the panels and the vinyl strips 18 are also quickly and easily forced into the spline grooves 12 and 26, providing a most effective seal against the passage of water. The several bars are all preferably extruded from a light weight metal, such as aluminum, are cheap to manufacture, easily installed and provides a very novel form of connecting means for roof forming panels.

It is to be understood that the invention is not limited to the precise construction shown, but that changes are contemplated as readily fall within the spirit of the invention as shall be determined by the scope of the subjoined claims.

Having described my invention, what I claim as new and desire to secure by Letters Patent is:

1. A roof forming structure including rafter beams and mullions, a connector bar for mounting on said rafter beams and mullions, said connector bar being of I-beam shape in cross section and having a base flange, a head flange and a vertical web extending between the flanges and co-operating therewith in forming oppositely-directed channels for the reception of roof panels, the head flange of said bar being provided along its marginal edge and in its under face with downwardly-directed spline grooves, yieldable splines being received within said grooves and bearing against the upper surfaces of the panels located between the flanges of said bar, the under surface of the head flange to the rear of the grooves being provided with a plurality of longitudinally-extending serrations, said serrations frictionally engaging marginal portions of the panels and whereby to retain the panels in place between the flanges of the bar.

2. A roof forming structure as provided for in claim 1, wherein the flanges and web of the bar are integrally formed, the head flange being of sufficient resiliency to enable it to be flexed toward the face of the panels disposed between it and the lower flange, and threaded fastening elements that extend through preformed apertures formed in the head flange, the panels, the lower flange and a head of the rafter beam whereby to fix the connector bar upon the rafter and to flex the head flange into engagement with the panels, the flexing of the head flange further compressing the splines in their engagement with the panels, said fasteners being disposed upon opposite sides of the web.

References Cited in the file of this patent

UNITED STATES PATENTS

| | | |
|---|---|---|
| 479,275 | Heywood | July 19, 1892 |
| 723,953 | Waldmire | Mar. 31, 1903 |
| 816,807 | Mellowes | Apr. 3, 1906 |
| 1,156,251 | Shuman | Oct. 12, 1915 |
| 1,931,750 | Blaski | Oct. 24, 1933 |
| 2,073,278 | Hohl | Mar. 9, 1937 |
| 2,314,949 | Palmer | Mar. 30, 1943 |
| 2,877,877 | Davis | Mar. 17, 1959 |
| 2,947,040 | Schultz | Aug. 2, 1960 |

FOREIGN PATENTS

| | | |
|---|---|---|
| 11,208 | Great Britain | 1899 |